B. LJUNGSTRÖM.
ROTATING BAFFLING DEVICE FOR GAS TURBINES.
APPLICATION FILED APR. 4, 1907.

945,180.

Patented Jan. 4, 1910.

WITNESSES

INVENTOR
Birger Ljungström
by Knight Bros

UNITED STATES PATENT OFFICE.

BIRGER LJUNGSTRÖM, OF STOCKHOLM, SWEDEN.

ROTATING BAFFLING DEVICE FOR GAS-TURBINES.

945,180.  Specification of Letters Patent.  Patented Jan. 4, 1910.

Application filed April 4, 1907. Serial No. 366,345.

*To all whom it may concern:*

Be it known that I, BIRGER LJUNGSTRÖM, a subject of the King of Sweden, residing at Stockholm, in the Kingdom of Sweden, have invented new and useful Improvements in Rotating Baffling Devices for Gas-Turbines, of which the following is a specification.

The present invention relates to a baffling device for elastic fluid turbines, consisting in a labyrinth packing arranged between the shaft and the turbine-casing adjacent to where the shaft leaves the latter. In order to make such packings effective, the driving-medium on its way through the packing, must be made to pass through a great number of contractions within the baffling device. These contractions must, moreover, be of such a form as to constantly compel the driving-medium to change its direction on passing through the ring chambers comprising the baffling device. To obtain the best baffling effect therefore the driving-medium must enter a ring-chamber in one direction and pass over to the next ring-chamber in another direction.

In the present invention which is illustrated on the annexed drawing, a plurality of plaited sheet-metal rings are so arranged as to form a very large number of contracted passages for the driving-medium, within a compartively small volume while at the same time the said rings occupy but a small space in an axial direction. This is of great importance, especially in that case, where the shaft supports a turbine-disk with a bearing only on one side.

Baffling devices heretofore utilized in known constructions, have the serious drawbacks (especially where they work with high pressures and a large number of revolutions), that they must both be cooled and oiled, besides requiring such a length of shaft, that for radial turbines with vane-supporting disks a great disadvantage is met with in that a great increase in the distance to the bearing outside the turbine housing, is necessitated.

Figure 1:
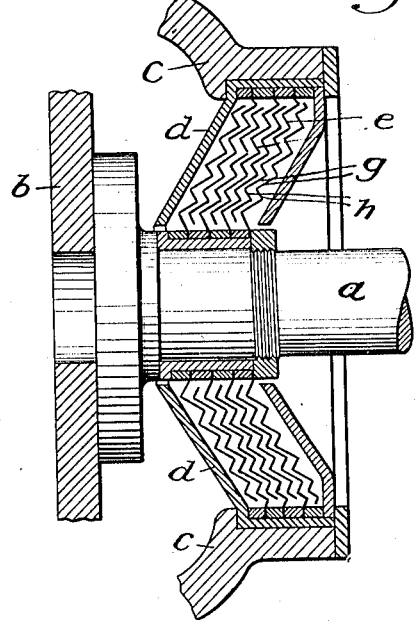
Figure 2:
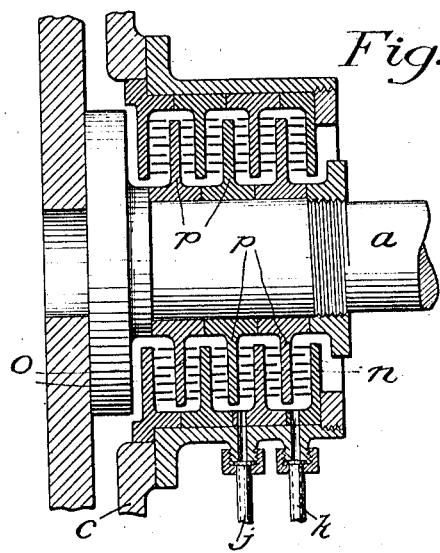

Referring now to the accompanying drawing, Figure 1 is a view, partly in section, of a rotating baffling device for gas turbines, embodying my invention, in which the sheet metal rings are plaited and conically arranged about the shaft as a center; Fig. 2 is a similar view in which the baffling rings are non-plaited and are arranged concentrically with the shaft.

Upon the shaft —$a$— and arranged in the turbine-casing —$c$— is secured a turbine disk —$b$— or other members connected therewith. Within an auxiliary casing —$d$— conected with the turbine casing baffling rings —$e$— are, according to the upper part of Fig. 1, stationarily connected to the casing —$d$— or to the turbine casing proper, while the baffling rings —$f$— are connected to the shaft or some part fastened thereto so as to rotate relatively to the rings —$e$—. The rings in this case are supposed to be made concentrically plaited or corrugated or in such a way as to form them with more or less sharp-edged corner-projections. The ring-shaped sheet-metal pieces thus formed are thus mounted in such manner that when the different rings are placed near each other, the parts —$g$— of the plaits lie closer to each other than the plait-parts —$h$—, in consequence whereof the parts —$g$— form narrow canals between themselves, connecting broader chambers formed by the parts —$h$—. Thus the driving-medium is forced to pass through the narrow channels in a different direction than that taken when passing through said broader chambers. The conical shape given the rings in this case gives them greater power of resistance against the influence of the driving-medium.

According to the lower part of Fig. 1 the baffling device consists of oppositely mounted cylindrical projections —$n$— and —$o$— situated partly on ring-shaped disks —$p$— carried by the shaft or on some part connected thereto, and partly, on similar disks —$q$— connected with the turbine casing —$c$— or some part attached thereto. The outflow from the labyrinth is here illustrated as being into conduits —$j$— and —$k$—. These conduits —$j$— and —$k$—, may if there is a super-pressure in the turbine casing, be connected with different zones of pressure in the vane-systems for the purpose of conducting to said systems that part of the steam or driving medium which leaks through the baffle, and the steam or driving medium may then do useful work and in that way decrease the losses through leakage. If there be a canal or a constant vacuum in the turbine-casing, either or both conduits may be used for conveying a portion of the driving medium to the baffling device, for the purpose of preventing air entering through the same into the turbine casing.

Fig. 2 shows a modification in the parts in which the device is made in the form of plaited cylinders, arranged concentrically with the shaft, and secured, partly, to the part —b— on shaft —a— and partly on the turbine casing —c—.

By means of the present invention not only does the baffle occupy the smallest possible space on the shaft but the further advantage is gained that conduits for cooling water and oil are made unnecessary by avoiding all wear and sliding friction. There is in addition, no loss of heat from the use of cooling-water so that the invention is especially valuable when used in radial turbines, as in these latter the use of a water-cooling device for the shaft-baffle, causes relatively larger losses of heat than in axial turbines, where the distance from the shaft-baffle to the warmer parts of the turbine may be made greater.

In the present baffling device it is advantageous to retain a certain pressure in some parts of the same in order to prevent leakage of air into the baffle to combine with the driving-medium.

Having thus described my invention, what I claim and desire to secure by Letters Patent is:

In combination with the shaft and turbine casing, of an elastic fluid turbine, an auxiliary casing, a plurality of disks mounted upon said shaft and within said casing, a plurality of disks mounted on the turbine casing within said auxiliary casing, all the said disks on the shaft and on the casing being provided with intermeshing rings projecting from the disks and arranged to form a series of radially-extending zig-zag passages for the elastic medium.

In testimony, that I claim the foregoing as my invention, I have signed my name in presence of two subscribing witnesses.

BIRGER LJUNGSTRÖM.

Witnesses:
CARL FRIBERG,
E. RÅBERG.